US008040938B2

(12) United States Patent
Cairns et al.

(10) Patent No.: US 8,040,938 B2
(45) Date of Patent: Oct. 18, 2011

(54) METHOD AND APPARATUS FOR EXTENDED LEAST SQUARES ESTIMATION FOR GENERALIZED RAKE RECEIVER PARAMETERS USING MULTIPLE BASE STATIONS

(75) Inventors: Douglas A. Cairns, Durham, NC (US); Gregory E. Bottomley, Cary, NC (US); Yi-Pin Eric Wang, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1109 days.

(21) Appl. No.: 11/609,373

(22) Filed: Dec. 12, 2006

(65) Prior Publication Data

US 2007/0098048 A1 May 3, 2007

Related U.S. Application Data

(63) Continuation-in-part of application No. 10/800,167, filed on Mar. 12, 2004, now Pat. No. 7,539,240.

(60) Provisional application No. 60/825,444, filed on Sep. 13, 2006.

(51) Int. Cl.
*H04B 1/00* (2006.01)
(52) U.S. Cl. ........................ 375/150; 375/152
(58) Field of Classification Search .................. 375/152, 375/150, 148, 147, 146, 144
See application file for complete search history.

(56) References Cited

U.S. PATENT DOCUMENTS

| | | | |
|---|---|---|---|
| 6,922,434 B2 | 7/2005 | Wang et al. | |
| 7,161,973 B2 * | 1/2007 | Ghosh | 375/147 |
| 2001/0028677 A1 * | 10/2001 | Wang et al. | 375/148 |
| 2001/0036812 A1 * | 11/2001 | Engstrom | 455/63 |
| 2002/0080863 A1 * | 6/2002 | Nielsen | 375/152 |
| 2003/0031234 A1 * | 2/2003 | Smee et al. | 375/147 |
| 2004/0146094 A1 * | 7/2004 | Kong et al. | 375/148 |
| 2005/0201447 A1 | 9/2005 | Cairns et al. | |
| 2006/0007990 A1 | 1/2006 | Cozzo et al. | |
| 2006/0182204 A1 | 8/2006 | Cairns et al. | |
| 2007/0189632 A1 | 8/2007 | Wu et al. | |

OTHER PUBLICATIONS

Gideon Kutz and Amir Chass, "Low Complexity Implementation of a Downlink CDMA Generalized RAKE Receiver", Motorola Semiconductor Israel Ltd., IEEE 2002.*
Fulghum et al., "Low Complexity Parameter Estimation for the Multi-antenna Generalized Rake Receiver," 2006 IEEE 63rd Vehicular Technology Conference, Spring 2006, pp. 1874-1878, XP-2430340.

(Continued)

*Primary Examiner* — Chieh M Fan
*Assistant Examiner* — Aristocratis Fotakis
(74) *Attorney, Agent, or Firm* — Coats & Bennett, P.L.L.C.

(57) ABSTRACT

Exemplary combining weight generation is based on estimating received signal impairment correlations using a weighted summation of interference impairment terms, such as an interference correlation matrix associated with a transmitting base station, and a noise impairment term, such as a noise correlation matrix, the impairment terms scaled by fitting parameters. The estimate is updated based on adapting the fitting parameters responsive to measured signal impairment correlations. The interference matrices are calculated from channel estimates and delay information, and knowledge of the receive filter pulse shape. Instantaneous values of the fitting parameters are determined by fitting the impairment correlation terms to impairment correlations measured at successive time instants and the fitting parameters are adapted at each time instant by updating the fitting parameters based on the instantaneous values.

41 Claims, 4 Drawing Sheets

OTHER PUBLICATIONS

Grant et al., "Generalized Rake Receiver for MIMO Systems," Vehicular Technology Conference, Oct. 6, 2003, pp. 424-428, XP-10700815.

Co-pending U.S. Appl. No. 11/767,905, filed Jun. 25, 2007.

Co-pending U.S. Appl. No. 11/935,840, filed Nov. 7, 2007.

Murugesapillai, Navamshan et. al., "Iterative Methods for the G-Rake Receiver in HSDPA." IEEE Vehicular Technology Conference, Fall 2006, 5 pages.

* cited by examiner

METHOD AND APPARATUS FOR EXTENDED LEAST SQUARES ESTIMATION FOR GENERALIZED RAKE RECEIVER PARAMETERS USING MULTIPLE BASE STATIONS

This application is a continuation-in-part of pending application Ser. No. 10/800,167, entitled METHOD AND APPARATUS FOR PARAMETER ESTIMATION IN A GENERALIZED RAKE RECEIVER, filed Mar. 12, 2004, and claims the benefit of provisional application Ser. No. 60/825,444, entitled, EXTENDED LEAST SQUARES ESTIMATION FOR MULTI-BASE STATION PARAMETRIC G-Rake, filed Sep. 13, 2006, both of which are incorporated herein by reference in their entirety.

BACKGROUND OF THE INVENTION

The present invention generally relates to wireless communication services, and particularly relates to tracking signal impairment correlations of received communication signals from multiple base stations.

RAKE receivers are well known in the communication arts and find widespread use in Code Division Multiple Access (CDMA) systems, such as in IS-95, IS-2000 (cdma2000), and Wideband CDMA (WCDMA) wireless communication networks. The name derives from the rake-like appearance of such receivers, wherein multiple, parallel receiver fingers are used to receive multiple signal images in a received multipath signal. By coherently combining the finger outputs in a RAKE combiner, the conventional RAKE receiver can use multipath reception to improve the Signal-to-Noise Ratio (SNR) of the received multipath signal.

However, as is known to those skilled in the art, the conventional RAKE receiver is optimal only in certain limited circumstances. For example, the presence of self-interference and multi-user access interference both degrade the performance of a conventional RAKE receiver. To that end, the assignee of the instant application has made application for one or more patents relating to the use of a "generalized" RAKE (G-Rake) receiver architecture, wherein receiver performance is improved by increasing the sophistication of combining weight generation.

In the G-Rake architecture, the combining weight calculations consider correlations of one or more signal impairments across RAKE fingers. For example, a G-Rake receiver may track noise correlations across those fingers. G-Rake receivers also may include a comparatively larger number of fingers such that extra fingers may be positioned off of the signal path delays. Indeed, a G-Rake receiver can gain performance improvements by shifting these extra fingers to maximize the SNR of the received signal. Correlations of signal impairments can also be used in SNR estimating often referred to as signal to interference ratio (SIR) estimation. SIR estimation is used in power control, rate control, and in monitoring link quality. The term "RAKE" is used herein generally to refer to RAKE and G-Rake processing.

By using its knowledge of how selected signal impairments are correlated across fingers, the G-Rake receiver can compensate the finger combining weights such that receiver performance is improved. Of course, the need to determine signal impairment correlations with sufficient accuracy and rapidity stands as a primary challenge associated with implementation of the G-Rake receiver.

Parent application Ser. No. 10/800,167, entitled METHOD AND APPARATUS FOR PARAMETER ESTIMATION IN A GENERALIZED RAKE RECEIVER, filed Mar. 12, 2004 and incorporated herein by reference in its entirety, describes a method and apparatus to estimate signal impairment correlations for one or more received signals of interest using a model-based technique. According to this technique, the model is adapted responsive to recurring measurements of signal impairment correlations that can be made on a frequent basis, e.g., every timeslot of a Wideband CDMA (WCDMA) frame, thereby dynamically tracking even rapidly changing signal impairment correlations. A method of determining received signal impairment correlations for use in generating G-Rake combining weights and/or SIR estimates comprises providing a model of received signal impairment correlations comprising one or more impairment terms scaled by corresponding model fitting parameters, and adapting each of the model fitting parameters responsive to recurring measurements of the received signal impairment correlations such that the model of received signal impairment correlations dynamically tracks changing reception conditions.

In particular, in one embodiment of this method the model of received signal impairment correlations is $R_u = \alpha R_I + \beta R_n$ where $R_I$ is an interference correlation matrix, and $R_n$ is a thermal noise correlation matrix arising from the autocorrelation properties of receiver filtering. The method comprises the following steps, performed at each of a number of repeating time intervals:

a. Measure impairment correlations for the received signal in the current slot, i.e., determine a rough estimate of impairment correlations expressed as matrix $\hat{R}(slot)$;

b. Calculate per-slot model terms $R_I(slot)$ and $R_n(slot)$ based on estimated channel coefficients;

c. Determine instantaneous model fitting parameters $\alpha_{inst}$ and $\beta_{inst}$ for the slot based on performing a Least Squares fit of, $$\hat{R}_u(slot) \approx \alpha_{inst} R_I(slot) + \beta_{inst} R_n(slot);$$

d. Update the model fitting parameters $\alpha$ and $\beta$ based on the instantaneous fitting parameters, e.g., update filtered values of $\alpha$ and $\beta$ using $\alpha_{inst}$ and $\beta_{inst}$; and e. Calculate the modeled impairment correlations $\tilde{R}_u(slot)$ to be used in generating RAKE combining weights and an SIR estimate for the current slot as, $$\tilde{R}_u(slot) = \alpha R_I(slot) + \beta R_n(slot).$$

The parent application additionally describes a model of received signal impairment correlations in which interference from another base station is considered, i.e., $\hat{R}_u = \alpha R_I + \beta R_n + \gamma R_O$ where $R_I$ is the same-cell or own-cell interference correlation matrix and $R_O$ corresponds to other-cell interference. The other-cell interference may be estimated in a number of ways, such as modeling it as white noise that has passed through the transmit pulse shaping filter.

In one embodiment disclosed in the parent application, during soft handoff, a set of receiver RAKE fingers is allocated to the signal from a first base station, and another set of RAKE fingers is allocated to the signal from a second base station. When computing combining weights for the first base station signal, the receiver treats the second base station signal as other-cell interference. When computing weights for the second base station signal, it treats the first base station signal as other-cell interference. However, in each case, the method measures received signal impairment correlations considering only the pilot signal from the respective own-cell base station.

SUMMARY OF THE INVENTION

The present invention provides a method and apparatus to estimate signal impairment correlations from pilot signals for one or more received signals of interest from a plurality of base stations using a model-based technique wherein fitting parameters are adapted responsive to recurring correlation measurements that can be made on a frequent basis, e.g., every timeslot of a Wideband CDMA (WCDMA) frame, thereby dynamically tracking even rapidly changing signal impairment correlations. The estimated impairment covariance matrix comprises a weighted summation of a plurality of impairment correlation terms. The fitting parameters are adapted in response to recurring measurements of correlations associated with a plurality of transmitters.

In one embodiment, the present invention relates to a method of determining received signal impairment correlations for use in processing signals received from a plurality of transmitters. Correlations associated with the plurality of transmitters are measured. Impairment correlation terms associated with the plurality of transmitters and the measured correlations are formed. Fitting parameters are adapted responsive to the measured correlations and the impairment correlation terms. Impairment correlations are estimated using the fitting parameters and the impairment correlation terms.

In another embodiment, the present invention relates to a wireless communication terminal for use in a wireless communication network. The terminal includes a radio front-end circuit configured to provide a plurality of received signals from different transmitters and a receiver circuit configured to generate one or more RAKE combined signals by RAKE processing received signals from the plurality of transmitters. The receiver circuit is configured to calculate RAKE combining weights by measuring received signal impairment correlations using despread values from pilot signals associated with the plurality of transmitters; fitting the measured received signal impairment correlations to a weighted sum of impairment correlation terms associated with the plurality of transmitters and the measured correlations; adapting fitting parameters responsive to the measured correlations and the impairment correlation terms; and estimating impairment correlations using the fitting parameters and the impairment correlation terms.

In yet another embodiment, the present invention relates to a method of received signal processing. For each significant base station, a measurement finger is allocated to each multipath delay value of a pilot signal; additional measurement fingers are allocated to the base station, if sufficient measurement fingers are available; medium coefficients are computed for the path fingers; net coefficients are computed for all fingers allocated to the base station; a measured interference matrix is computed for the base station; model interference components are computed for the base station; and a least squares problem is formulated to solve fitting parameters of the model interference components. The least squares problems for all base stations are then concatenated into a joint least squares problem, and the joint least squares problem is solved to estimate the fitting parameters.

DETAILED DESCRIPTION OF THE INVENTION

In accordance with one or more exemplary embodiments of the present invention, a receiver, such as the receiver circuit of a mobile terminal for use in a wireless communication network, includes a generalized RAKE receiver circuit that generates RAKE combining weights and SIR estimates based on modeled received signal impairment correlations from two or more base stations. As is known in the RAKE receiver arts, the output signals obtained from the individual RAKE fingers can include cross-correlated "impairments." As used herein, the term "impairment" has a broad definition that includes, but is not limited to, one or more of the following items: self and multi-user interference and noise. For additional background regarding exemplary generalized RAKE operations, one may refer to the co-pending and commonly assigned U.S. patent application assigned Ser. No. 09/344,899, which is incorporated herein by reference.

In the generalized RAKE architecture, denoted as "G-Rake" herein, the combining weights used to combine the RAKE finger outputs are compensated for cross-finger correlations in two or more of these impairment terms representing both own-cell and other-cell interference. The present invention provides a method and apparatus for carrying out such compensation using a model-based approach that considers signals from two or more transmitters, such as base stations.

Figure 1:
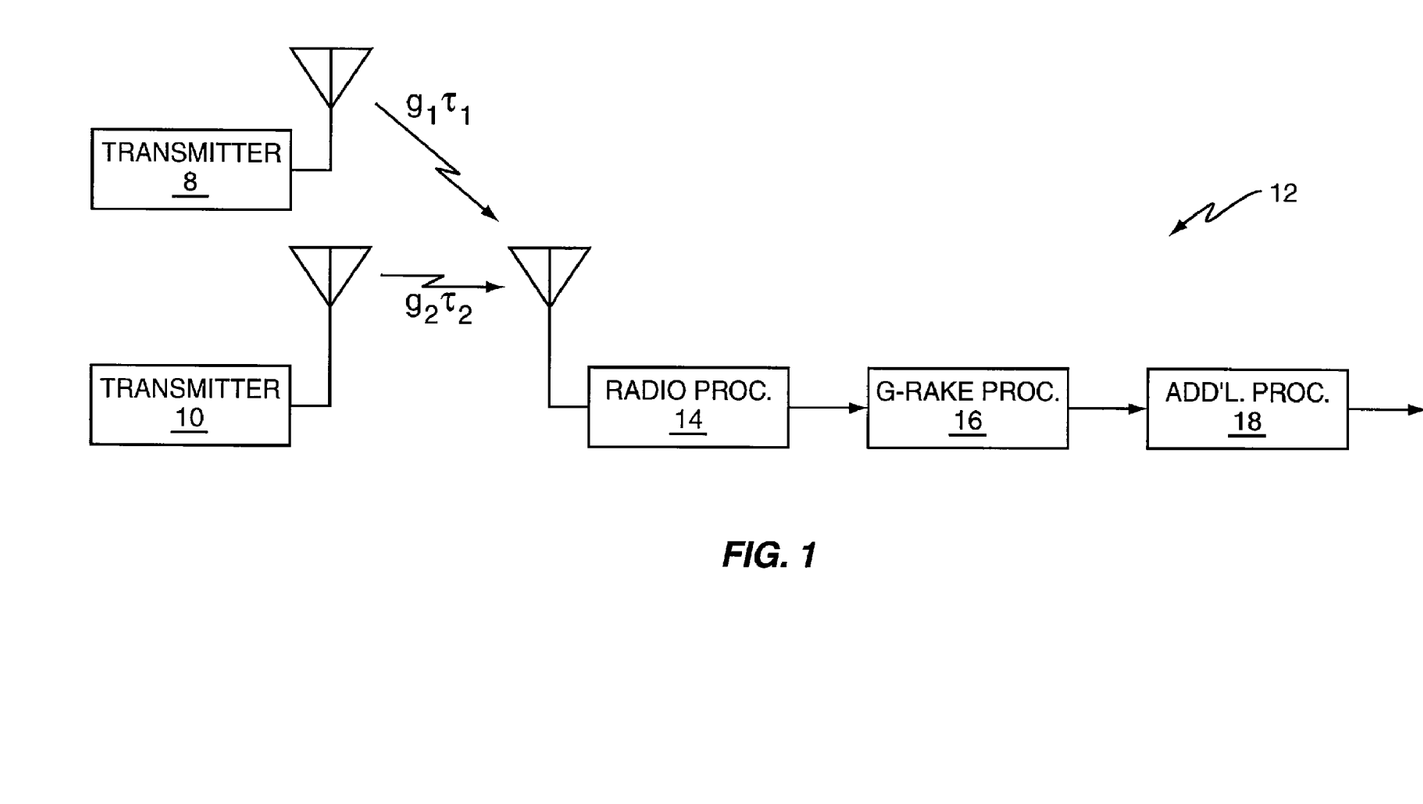
FIG. 1 is a functional block diagram of multiple transmitters and a receiver, wherein the receiver includes a generalized RAKE receiver circuit according to one or more embodiments of the present invention.

FIG. 1 broadly illustrates two transmitters 8, 10 which may for example comprise base stations in a wireless communication network, and a receiver 12, such as a mobile terminal or other wireless communication device. The exemplary transmitters 8, 10 each use spread-spectrum modulation to transmit spread-spectrum signals including a traffic signal and a pilot signal. The signals pass through a radio channel and are received at an antenna of the receiver 12, each having, in general, a different channel coefficient g and delay τ. Though only one receive antenna is shown, it will be apparent to one of ordinary skill in the art how the invention operates with multiple receive antennas. Thus, the receiver 12 receives the transmitted signal(s) plus noise and interference, and a radio processor 14 generates received signal samples, r, from that corrupted received signal.

While the details of radio processor 14 in at least some embodiments will be familiar to those skilled in the art, an exemplary radio processor 14 comprises filtering and conversion circuits, e.g., analog-to-digital converters, such that the received signal is represented by a series of digitized baseband signal samples input to a G-Rake processor 16. In turn, processor 16 demodulates the received signal samples to produce soft values or bit estimates. These estimates are provided to one or more additional processing circuits 18 for further processing, such as forward-error-correction (FEC) decoding and conversion into speech, text, graphical images, or the like. Those skilled in the art will recognize that the particular information type(s) carried by the received signal and the particular processing steps applied by the receiver 12 are a function of its intended use and type. The G-Rake processor 16 also estimates received signal quality by producing SIR estimates that also are based on the modeled impairments.

As known in the art, a RAKE receiver comprises a plurality of fingers. The G-Rake receiver of the present invention preferably comprises a large number of fingers. Measurement fingers of the G-Rake receiver are assigned to two or more base stations 8, 10. As used herein, a "measurement" finger is a finger assigned to despread the pilot channel of a particular base station for a given set of delays. A measurement finger is distinguished from a combining finger, which despreads signals from a traffic channel of the base station.

Measurement fingers are assigned to all significant base stations. As used herein, a basis station is "significant" if it's average power, as detected at the receiver, is within a predetermined range (i.e., x dB) of the base station with the largest average power. In one embodiment, the predetermined range may be dynamic (i.e., x may be a variable). As a non-limiting example, x may be in the 3-6 dB range. Note, in particular, that the number of significant base stations may exceed the number of base stations in a mobile terminal's active set (i.e., the number of base stations participating in a soft handoff). The term "significant" can be defined in other ways, such as the strongest base stations (on average or instantaneously) or the base stations that most impact SIR. While embodiments of the present invention are described herein as, e.g., assigning fingers to, and receiving signals from, base stations, those of skill in the art will readily recognize that the invention is not limited to processing signals received from base stations, but more generally may be advantageously used to process signals received from any transmitter transmitting spread-spectrum signals. Accordingly, as used herein, the terms "base station" and "transmitter" are interchangeable, unless the specific context indicates otherwise.

The summation equation defining a composite model of the impairment covariance matrix $R_u$ of a parametric G-Rake receiver including contributions from multiple base stations J is $$R_u = \sum_{j=1}^{J} E_c(j) R_j(g_j) + N_0 R_n, \quad (1)$$

where $g_j$ is a vector of channel coefficients, $E_c(j)$ represents the total energy per chip of base station j, and $N_0$ represents the power spectral density or power of the white noise (thermal noise and other interference) passing through the receive filter. For each base station j—that is, for each index of the summation—equation (1) provides a component of the composite model of the total impairment covariance matrix $R_u$, the component defining the contribution of the $j^{th}$ base station.

$R_j(g_j)$ depends on whether the interference is own-cell, including orthogonal co-channel interference, or other-cell, with no orthogonality. For own-cell interference, the elements of $R_j(g_j)$ are given by $$R_j^{own}(d_1,d_2) = \sum_{l=0}^{L_j-1} \sum_{q=0}^{L_j-1} g_j(l) g_j^*(q) \quad (2)$$

$$\sum_{m=-\infty, m \neq 0}^{m=\infty} R_p(d_1 - mT_c - \tau_j(l)) R_p^*(d_2 - mT_c - \tau_j(q))$$

while for other-cell interference, the elements of $R_j(g_j)$ are given by $$R_j^{other}(d_1,d_2) = \quad (3)$$

$$\sum_{l=0}^{L_j-1} \sum_{q=0}^{L_j-1} g_j(l) g_j^*(q) \sum_{m=-\infty}^{m=\infty} R_p(d_1 - mT_c - \tau_j(l)) R_p^*(d_2 - mT_c - \tau_j(q))$$

Here, $R_p(\Delta)$ represents the autocorrelation of the pulse shape filter evaluated at $\Delta$, $T_c$ is the chip duration, and $g_j(q)$ and $\tau_j(q)$ are the complex coefficient and path delay for the $q^{th}$ path of the base station j signal, respectively. Note that only the m=0 term in the summation differentiates equations (2) and (3).

The problem for a receiver modeling multiple base stations is that $E_c(j)$ and $N_0$ are unknown. To construct $R_u$, the receiver must estimate these or related parameters. In addition, $g_j$ must be estimated; however, this is straightforward.

The parent application Ser. No. 10/800,167, describes a procedure wherein model impairment covariance terms ($R_j(g_j)$ and $R_n$ from (1)) are fitted to a measured impairment covariance matrix using a least-squares approach. The measured impairment covariance matrix is obtained from fingers assigned to the pilot channel of a single base station. The parameter estimates are updated periodically, such as at the slot rate.

This approach, however, performs poorly when estimating more than two parameters. Simulations have shown that with this approach, it is better to concentrate on suppressing own-cell interference (i.e., estimate only two parameters—own-cell interference and noise—with a least-squares approach) rather than trying to suppress other-cell interference (requiring the estimation of more than two parameters). However, this contradicts ideal receiver results which show, at times, a substantial gain from suppressing both own-cell interference and other-cell interference.

In a parametric G-Rake receiver where estimation of receiver quantities is realized using the pilot channel, equations (1), the composite model of the impairment covariance matrix $R_u$, and equations (2) and (3), specifying the interference correlation matrix $R_j(g_j)$ for own-cell and other-cell interference, may be rewritten as the weighted sum:

$$R_u = \sum_{j=1}^{J} \alpha(j) R_j(\tilde{g}_j, \tau_j, d_j) + \beta R_n, \quad (4)$$

where $$R_j^{own}(d_1, d_2) = \sum_{l=0}^{L_j-1} \sum_{q=0}^{L_j-1} \tilde{g}_j(l) \tilde{g}_j^*(q) \quad (5)$$

$$\sum_{m=-\infty, m \neq 0}^{m=\infty} R_p(d_1 - mT_c - \tau_j(l)) R_p^*(d_2 - mT_c - \tau_j(q))$$

$$R_j^{other}(d_1, d_2) = \sum_{l=0}^{L_j-1} \sum_{q=0}^{L_j-1} \tilde{g}_j(l) \tilde{g}_j^*(q) \sum_{m=-\infty}^{m=\infty} R_p(d_1 - mT_c - \tau_j(l)) \quad (6)$$

$$R_p^*(d_2 - mT_c - \tau_j(q))$$

$$\tilde{g}_j = \left(\sqrt{E_{pilot}(j)}\right) g_j,$$

$$\alpha_j = \frac{E_c(j)}{E_{pilot}(j)}$$

Here, $E_{pilot}(j)$ is the pilot symbol energy for base station j and $\beta = N_0$. $R_j(*)$ has been rewritten to clearly show that it is a function of the estimated medium coefficients ($\tilde{g}_j$), path delays ($\tau_j$), and finger delays ($d_j$).

Figure 2:
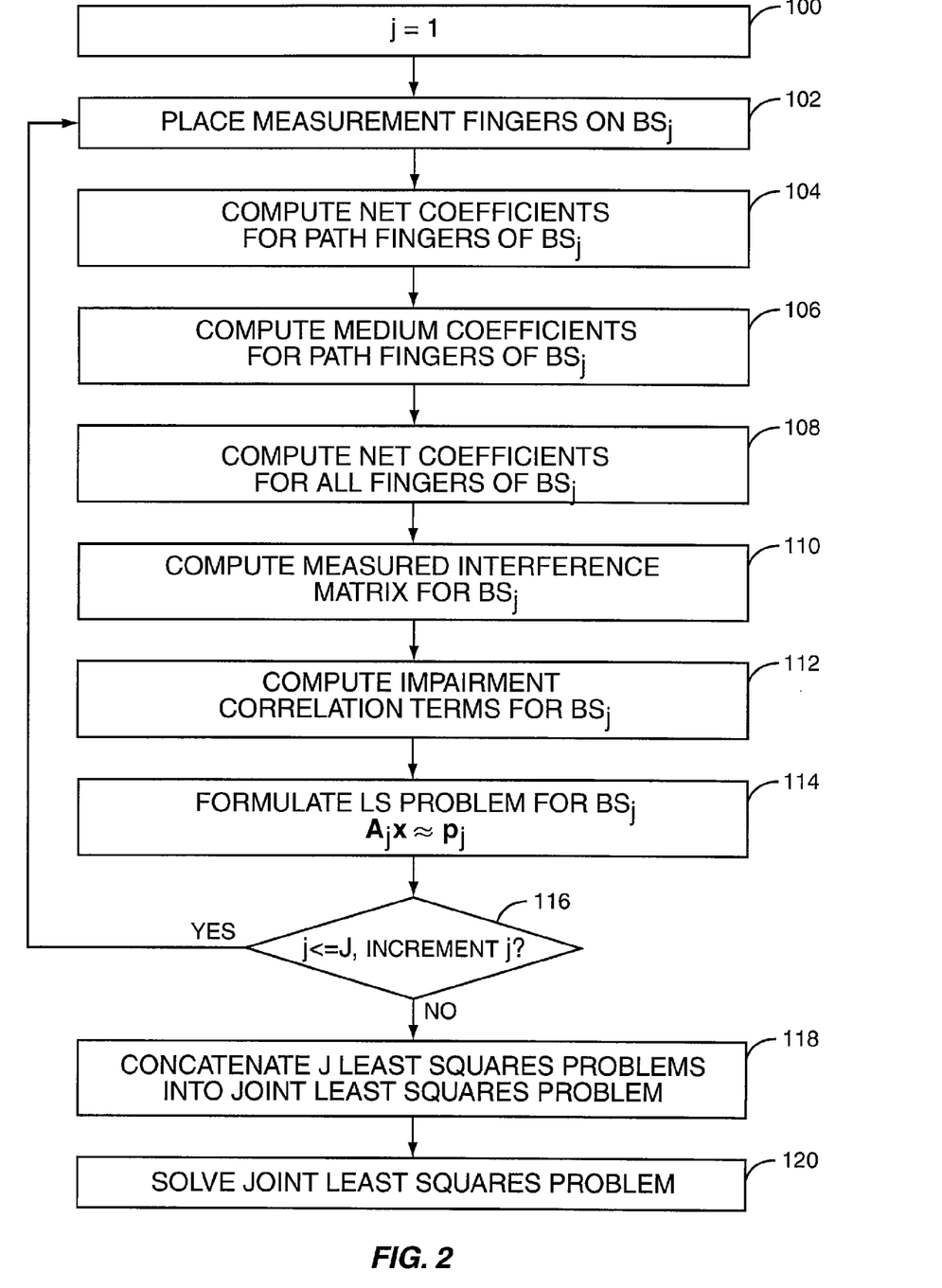
FIG. 2 is a flow diagram of an exemplary method of estimating received signal impairment correlations according to the present invention.

FIG. 2 depicts a method of estimating the G-Rake parameters by a receiver, using pilot signals from two or more base stations. The entire method is executed periodically, such as every traffic channel slot in a WCDMA system, during which the receiver receives ten pilot channel symbols on a Common Pilot Channel (C-PICH). The method may be implemented in the receiver using an appropriately programmed DSP, microprocessor, or the like.

In general terms, the method comprises a sequence of three steps for each time slot. The first step is the formation of a least-squares problem per transmitter to fit the weighted sum of impairment plus noise terms to the measured impairment correlation matrix associated with the transmitter (treating the interference from each transmitter, when calculating that transmitter's measurement, as own-cell interference and the interference from all other transmitters as other-cell interference). The second step is the concatenation of multiple least-squares problems into a joint least-squares problem. The final step is solving the joint least-squares problem to obtain fitting parameters that closely match the composite model to the measured received signal impairment correlations.

In greater detail, and with reference to FIG. 2, following initialization (block 100), measurement fingers are placed on all significant base stations (block 102). If there are $L_j$ path delays for base station j, then at least $L_j$ measurement fingers should be assigned to base station j. If sufficient fingers are available, $Q_j$ fingers ($Q_j > L_j$) are allocated to base station j.

For each significant base station j, fitting equations can be set up to fit the measured received signal impairment correlations (blocks 104-114). First, the net channel coefficients for the $L_j$ path delays are computed (block 104), using $$\hat{h}_j = \frac{1}{10} \sum_{i=1}^{10} x_j(i) s^*(i)$$

where $x_j(i)$ is a vector of the despread pilot symbols for the $L_j$ path delays of the $j^{th}$ base station for the $i^{th}$ symbol.

The medium coefficients for the $L_j$ path delays are computed (block 106), using $$\tilde{g}_j = \begin{bmatrix} R_p(\tau_j(0)-\tau_j(0)) & R_p(\tau_j(0)-\tau_j(1)) & \cdots & R_p(\tau_j(0)-\tau_j(L_j-1)) \\ R_p(\tau_j(1)-\tau_j(0)) & R_p(\tau_j(1)-\tau_j(1)) & \cdots & R_p(\tau_j(1)-\tau_j(L_j-1)) \\ \vdots & \vdots & \ddots & \\ R_p(\tau_j(L_j-1)-\tau_j(0)) & R_p(\tau_j(L_j-1)-\tau_j(1)) & \cdots & R_p(\tau_j(L_j-1)-\tau_j(L_j-1)) \end{bmatrix}^{-1} \hat{h}_j$$

The net channel coefficients for all $Q_j$ fingers are computed (block 108), using $$\tilde{h}_j = \begin{bmatrix} R_p(d_j(0)-\tau_j(0)) & R_p(d_j(0)-\tau_j(1)) & \cdots & R_p(d_j(0)-\tau_j(L_j-1)) \\ R_p(d_j(1)-\tau_j(0)) & R_p(d_j(1)-\tau_j(1)) & \cdots & R_p(d_j(1)-\tau_j(L_j-1)) \\ \vdots & \vdots & \ddots & \\ R_p(d_j(Q_j)-\tau_j(0)) & R_p(d_j(Q_j)-\tau_j(1)) & \cdots & R_p(d_j(Q_j)-\tau_j(L_j-1)) \end{bmatrix}^{-1} \tilde{g}_j$$

The measured noise covariance is computed (block 110), using $$\hat{R}_u(d_j) = \frac{1}{9} \sum_{i=1}^{10} (x_j(i) s^*(i) - \tilde{h}_j)(x_j(i) s^*(i) - \tilde{h}_j)^H$$

Here, $x_j(i)$ is a vector of the despread pilot symbols for the $Q_j$ finger delays of the $j^{th}$ base station for the $i^{th}$ symbol, and the superscript H denotes Hermitian transpose.

The impairment correlation terms or structure elements are then computed (block 112), using equations (5) and (6), as if the base station j contributed own-cell interference and all other base stations contributed other-cell interference. In practice, the infinite summations of equations (5) and (6) may be truncated or computed using known analytical expressions.

The exemplary receiver is configured to generate measurements of the impairment covariance matrix $R_u$ on a short-term basis (every slot, every other slot, etc.). Given this measurement, knowledge of the channel (medium coefficients $\tilde{g}_j$ and path delays $\tau_j$), and the RAKE finger delays $d_j$, every quantity in Eq. (4) is known except for $\alpha$ and $\beta$. A least-squares problem may be formulated for each measured impairment correlation matrix—i.e., for each significant base station j (block 114). The defining least squares equation for base station j is $A_j x \approx p_j$, where $x = [\alpha_1, \alpha_2, \ldots \alpha_j \beta]^T$ is the set of fitting parameters.

The above calculations are repeated in each slot for each measurement (i.e., each significant base station j) (block 116). When all J significant base stations have been processed, the J least squares problems are concatenated into a joint least squares problem (block 118), as $$\begin{bmatrix} A_1 \\ A_2 \\ \vdots \\ A_J \end{bmatrix} x \approx \begin{bmatrix} p_1 \\ p_2 \\ \vdots \\ p_J \end{bmatrix}, \text{ or } Bx \approx y$$

Note: not all equations need to be used. For example, only the diagonal element equations could be used. While fitting a measured impairment correlation is used, it is possible to estimate the fitting parameters using other correlations, such as receive sample or despread value correlations.

This joint least squares problem may be solved (block 120) via $x = (B^T B)^{-1} B^T y$. Equations with complex quantities are treated as two real equations, as the fitting parameters are purely real. Also, since the fitting parameters are positive, clipping at zero can be used.

Once the fitting parameters $\alpha_1, \alpha_2, \ldots \alpha_J, \beta$ are calculated using pilot signals from all J significant base stations for a given iteration (e.g., WCDMA time slot), optional smoothing may be applied, such as by filtering (e.g., filtering over a plurality of WCDMA time slots). The receiver may then compute the estimated impairment correlation matrix $\tilde{R}_u$ to be used in generating the combining weights and an SIR estimate for the current slot. The SIR estimate and the combining weights used by the G-Rake receiver are such that the combination of the different signal images is carried out in consideration of the modeled impairment correlations between those images. These steps generally are repeated for each of a series of successive slots.

The G-Rake receiver forms combining weights using $\tilde{R}_u$, and $\tilde{h}$ by computing:

$$w = \tilde{R}^{-1} \tilde{h}.$$

Rather than inverting a matrix, an iterative approach such as Gauss-Seidel or Preconditioned Conjugate Gradient can be used (see Murugesapillai et al., "Iterative methods for the G-RAKE receiver in HSDPA," IEEE VTC 2006 Fall). The decision variable or symbol estimate is obtained by combining the traffic despread values, denoted y, giving $$z = w^H y.$$

The G-Rake receiver may also form a SIR estimate using $\tilde{R}_u$ and $\tilde{h}$ by computing:

$$SIR = \tilde{h}^H \tilde{R}_u^{-1} \tilde{h} = \tilde{h}^H w. \tag{18}$$

Figure 3:
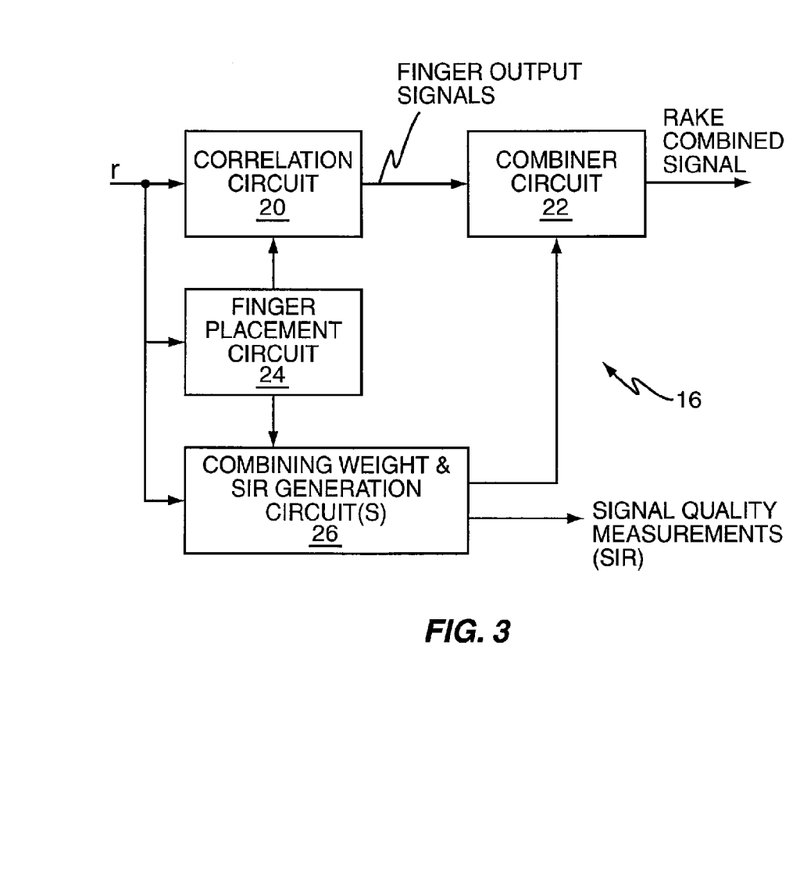
FIG. 3 is a functional block diagram of the generalized RAKE processor of FIG. 1.

FIG. 3 illustrates an exemplary G-Rake processor 16 comprising a correlation circuit 20, a combiner circuit 22, a finger placement circuit 24, and a combining weight and SIR estimate generation circuit 26. In operation, received samples are provided to the finger placement circuit 24, which determines what delays to use in correlating the received signal samples to the traffic spreading sequence(s). These delays are used in correlation circuit 20 to delay either the received signal sample stream or the spreading codes used by the individual RAKE fingers in the correlation circuit 20 to produce traffic correlation values according to the various finger placements. The delays as well as measurement delays are provided to the combining weight and SIR estimate generation circuit 26, which computes the combining weights used to combine the RAKE finger output signals from the correlation circuit 20. It also computes an SIR estimate. The finger output signals from correlation circuit 20 are combined using the combining weights in the combiner 22, producing combined values or soft bit values.

An exemplary correlation circuit 20 comprises a plurality of correlation units, also referred to herein as RAKE fingers, and each correlation unit can be placed at a desired relative time offset with respect to the received signal using correlation code offsets and/or adjustable delay elements, such as buffers. In exemplary G-Rake operation, finger placement circuit 24 controls correlation circuit 20 such that one or more RAKE fingers are time aligned with the relative path delays of selected signal images in the received signal (on-path fingers) and, typically, one or more of the RAKE fingers are placed off-path. Processor 16 can be configured to adjust the alignment of on-path and/or off-path RAKE fingers dynamically to maximize the SNR of the RAKE combined signal output from the combiner circuit 22.

Figure 4:
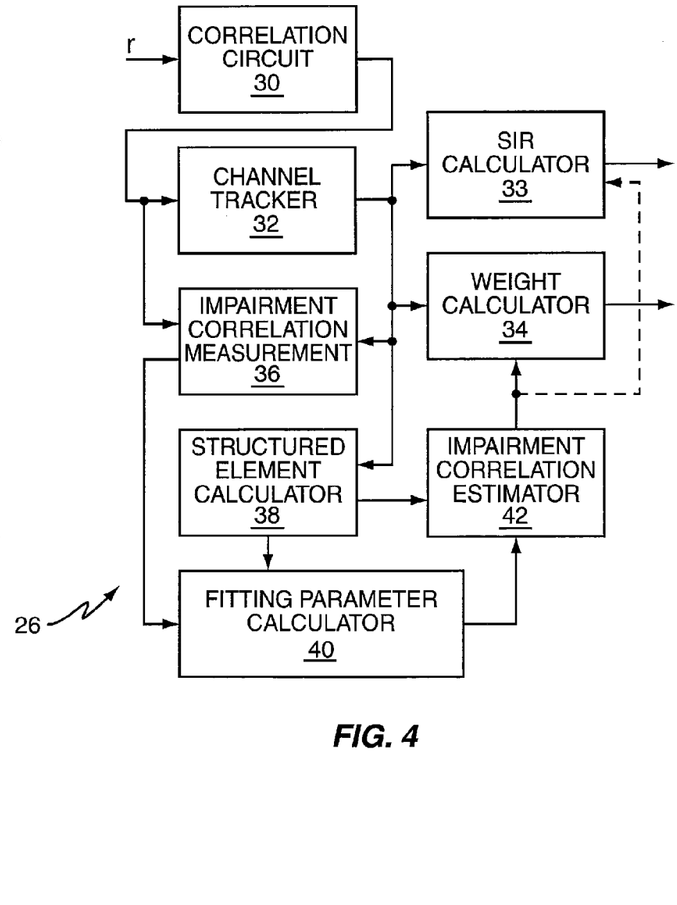
FIG. 4 is a functional block diagram of an exemplary combining weight and SIR generator included in the circuit of FIG. 3.

On that point, G-Rake processor 16 offers improved performance compared to conventional RAKE receivers under at least some reception conditions by considering the effects of received signal impairment correlations between the RAKE fingers in its generation of the combining weights. Of course, in the context of the present invention, combining weight generation benefits from the use of modeled impairment correlations. To that end, FIG. 4 illustrates an exemplary combining weight and SIR generation circuit 26 that is configured to generate combining weights according to one or more exemplary embodiments of model-based signal impairment compensation.

According to the illustration, circuit 26 comprises a correlation circuit 30, a channel tracker circuit 32, a SIR calculator 33, a combining weight calculation circuit 34, an impairment correlation measurement circuit 36, a structured element calculation circuit 38, a model fitting parameter calculation circuit 40, and an impairment estimation circuit 42.

In operation, the received samples are provided to correlation circuit 30 (the measurement fingers), which correlates the received samples to a pilot or other reference signal spreading sequence, and removes symbol modulation producing pilot correlation values. The channel tracker circuit 32 receives these pilot correlations and uses them to estimate or otherwise track channel coefficients for the received signal. These coefficients are provided to measurement circuit 36, which also receives the pilot correlations. Circuit 36 is configured to obtain impairment samples, i.e., impairment measurements for the received signal, by subtracting channel estimates from the pilot correlations and further configured to calculate impairment correlation measurements by correlating the impairment samples with each other and with themselves.

Structured element calculation circuit 38 receives the channel estimates and uses them to construct the elements corresponding to the impairment terms $R_j$ and $R_n$ for each measurement (i.e., associated with each significant base station 8, 10), which are referred to herein as structured elements or impairment correlation terms. The impairment correlation measurements, i.e., matrix $\hat{R}_u$ and the structured elements are provided to the model fitting parameter calculation circuit 40, which uses them to form the model fitting parameters $\alpha_j$ and $\beta$. The fitting parameters and the structured elements are provided to the impairment estimation circuit 42, which produces the estimated impairment correlation matrix $\tilde{R}_u$. The channel estimates and the estimated impairment correlation matrix are provided to the weight calculation circuit 34, which produces the combining weights to be used by combiner circuit 22 in RAKE combining the finger output signals from correlation circuit 20. The channel estimates and the estimated impairment correlation matrix are also provided to the SIR calculator 33, which produces a SIR estimate for power control or rate adaptation purposes.

With the above exemplary details in mind, those skilled in the art will appreciate that the present invention broadly fits measured received signal impairment correlations, which measurements typically have some estimation errors, to a composite impairment model comprising a structured form that is the summation, over each significant base station, of a scaled sum of structured matrix elements. The composite impairment model thus considers interference from multiple base stations, in turn modeling each base station as generating same-cell interference (when fitting the measurement associated with that base station) and as generating other-cell interference (when calculating all other model components).

Figure 5:
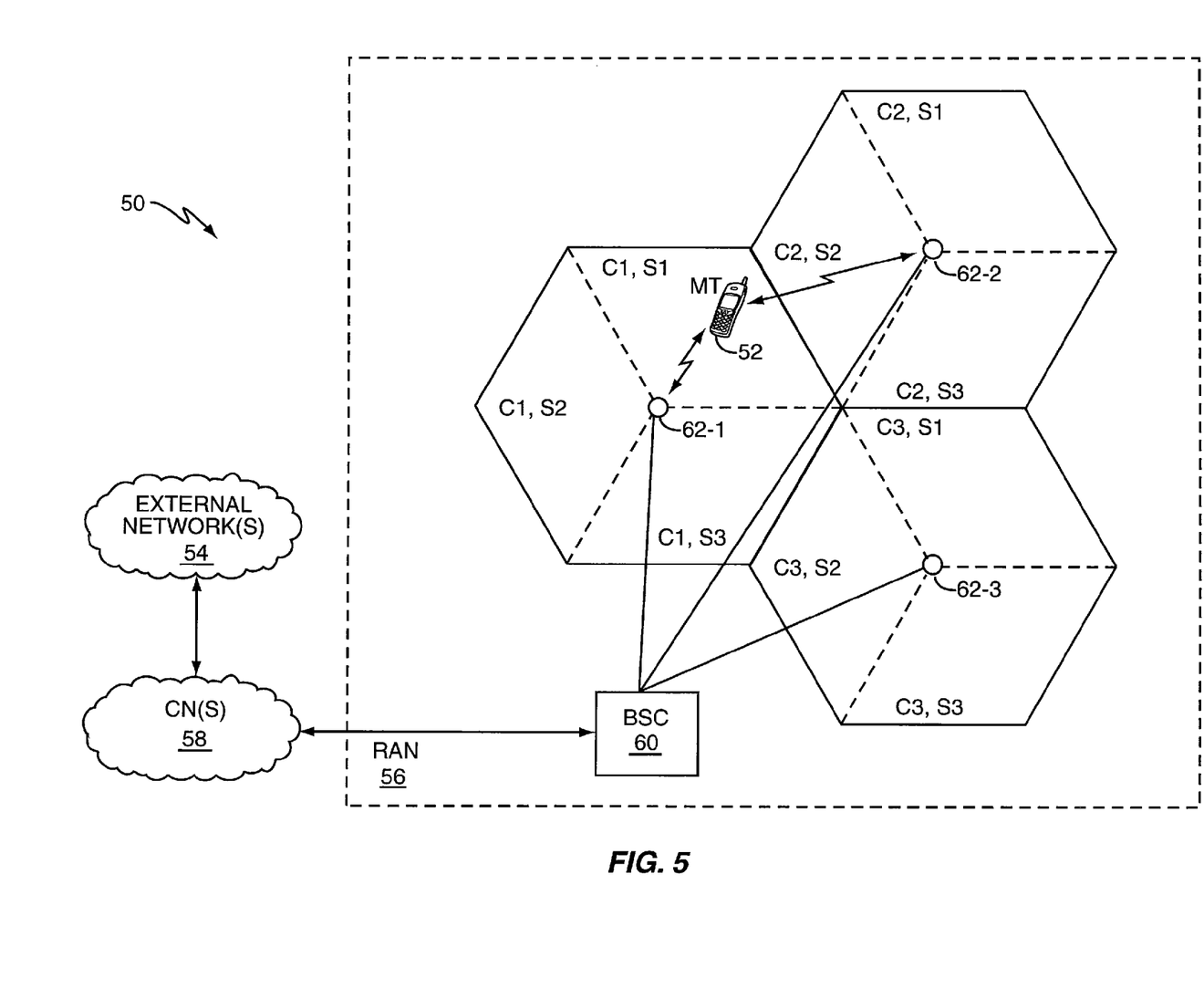
FIG. 5 is a functional block diagram of an exemplary wireless communication network, in which a mobile terminal includes a receiver circuit configured according to the present invention.

FIG. 5 provides an exemplary illustration of a wireless communication network 50, which may be configured as a WCDMA wireless cellular network, as an IS-95/IS-2000 wireless cellular network, or configured according to some other open or proprietary communication standard.

Network 50 supports a plurality of mobile terminals 52—only one terminal is shown for clarity—operating in one or more radio service areas denoted as C1, S1, C2, S2, and so on, to represent Cell 1, Sector 1 and Cell 2, Sector 2, etc. Those skilled in the art will appreciate that the terms "cell" and/or "sector" as used herein should be given broad construction and, in general, the term sector should be understood as identifying a given radio coverage area at a given carrier frequency. Thus, a given cell may have multiple overlaid radio sectors corresponding to multiple carrier frequencies.

In any case, network 50 communicatively couples mobile terminals 52 to one or more external networks 54, such as the Public Switched Telephone Network (PSTN), the Internet or other Public Data Networks, ISDN-based networks, etc. Such coupling is supported by Radio Access Network (RAN) 56, which provides the radio link(s) to the mobile terminals 52, and which interfaces to one or more Core Networks (CNs) 58 that in turn link to the external networks 54. Those skilled in the art will appreciate that the particular network architecture adopted, and the entity nomenclature used varies according to the network standard involved, but such variations are not germane to understanding or explaining the present invention. Moreover, it should be understood that the illustrated network is simplified and that actual network implementations likely will have additional entities not illustrated herein for clarity.

An exemplary RAN 56 comprises one or more base station systems, each typically comprising a control entity and one or more distributed radio transceiver entities. In the illustration, such entities are depicted as one Base Station Controller (BSC) or RNC 60, and a plurality of associated Radio Base Stations (RBSs) or Node B's 62, e.g., 62-1, 62-2, and 62-3. The illustrated mobile terminal 52 includes the exemplary receiver 12 illustrated earlier herein, which it may implement using various processing circuits, including A/D converters, filters, DSPs or other digital processors, memory, and the like. In at least one exemplary embodiment, mobile terminal 52 includes one or more DSPs and/or Application Specific Integrated Circuits (ASICs), or other programmable devices, to implement receiver 12, including G-Rake processor 16, as illustrated in exemplary fashion in FIGS. 2, 3, and 4. It should be understood that at least a portion of the present invention's functionality thus can be embodied as stored computer instructions in the form of micro-code, firmware, software, etc.

More generally, the present invention can be implemented in hardware, software, or essentially any combination thereof, according to the needs of particular design. Indeed, the present invention is not limited by the foregoing discussion or by the accompanying figures. Instead, the present invention is limited only by the following claims and the reasonable equivalents thereof.

What is claimed is:

1. A method of determining received signal impairment correlations for use in processing signals received from a plurality of transmitters, the method comprising:
   measuring signal impairment correlations associated with the plurality of transmitters;
   forming a parametric mathematical model comprising impairment correlation terms associated with the plurality of transmitters and the measured correlations;
   jointly adapting fitting parameters associated with the plurality of transmitters responsive to the measured signal impairment correlations and the impairment correlation terms; and
   estimating impairment correlations by using a fitting process to fit the impairment correlation terms, scaled by the fitting parameters, to the measured signal impairment correlations.

2. The method of claim 1 wherein measuring signal impairment correlations associated with the plurality of transmitters comprises measuring received signal impairment correlations using pilot despread values.

3. The method of claim 2 wherein jointly adapting fitting parameters associated with the plurality of transmitters responsive to the measured signal impairment correlations and the impairment correlation terms comprises fitting measured received signal impairment correlations to a weighted sum of impairment correlation terms.

4. The method of claim 1 wherein forming impairment correlation terms associated with the plurality of transmitters and the measured correlations further comprises forming a plurality of interference impairment terms and a noise impairment term.

5. The method of claim 4 wherein the interference impairment terms comprise interference correlation matrices and the noise impairment term comprises a noise correlation matrix.

6. The method of claim 5 wherein elements of the interference correlation matrices are determined from channel estimates corresponding to received pilot signals.

7. The method of claim 4 wherein the interference impairment term corresponding to the transmitter associated with the measured correlation is computed as same-cell interference and the interference terms corresponding to other transmitters are computed as other-cell interference.

8. The method of claim 1 wherein the number of measurements associated with different transmitters is determined by the number of significant transmitters transmitting pilot signals to the receiver.

9. The method of claim 8 wherein a transmitter is significant if it has an average received signal strength within a predetermined range of the greatest average received signal strength among the plurality of transmitters.

10. The method of claim 8 wherein a transmitter is significant if it has an average received signal strength that is the strongest or second strongest of all received transmitted signals.

11. The method of claim 9 wherein the predetermined range is dynamically altered during reception.

12. The method of claim 2 wherein jointly adapting fitting parameters associated with the plurality of transmitters responsive to the measured signal impairment correlations and the impairment correlation terms comprises calculating updated fitting parameters for each recurring time slot based on the measured impairment correlations.

13. The method of claim 12 wherein calculating updated fitting parameters for each recurring time slot based on the measured signal impairment correlations comprises formulating a least squares estimation process on the fitting parameters to make the weighted sum of interference and noise correlation terms closely match measured impairment correlations.

14. The method of claim 13 wherein calculating updated fitting parameters for each slot based on the measured impairment correlations further comprises concatenating least squares estimation processes formulated for each measurement into a joint least squares estimation process and solving the joint least squares estimation process.

15. The method of claim 1 wherein jointly adapting fitting parameters associated with the plurality of transmitters responsive to the measured signal impairment correlations and the impairment correlation terms comprises determining instantaneous values of the fitting parameters by fitting the impairment correlation terms to measured signal impairment correlations at each time instant.

16. The method of claim 15 further comprising maintaining smoothed values of the instantaneous fitting parameters by filtering the instantaneous values, and using the smoothed values as the fitting parameters.

17. The method of claim 16 wherein received signal impairment correlations are determined for a Wideband CDMA (WCDMA) communication signal, and wherein determining instantaneous values of the fitting parameters by fitting the measured signal impairment correlations at each time instant comprises measuring impairment correlations of the WCDMA communication signal in each defined timeslot, and wherein maintaining smoothed values of the fitting parameters by filtering the instantaneous values of the fitting parameters comprises filtering the instantaneous values of the fitting parameters over multiple timeslots.

18. The method of claim 1 wherein estimating impairment correlations comprises estimating the received signal impairment correlations associated with each transmitter as an interference covariance matrix scaled by a corresponding model fitting parameter and a noise covariance matrix scaled by an associated model fitting parameter.

19. The method of claim 1 further comprising using estimated impairment correlations for at least one of generating combining weights for combining despread values of received signals and generating estimates of received signal quality.

20. The method of claim 2 wherein jointly adapting fitting parameters associated with the plurality of transmitters responsive to the measured signal impairment correlations and the impairment correlation terms comprises updating the impairment correlation terms at successive time instants based on current channel estimates and path delays for pilot signals from associated transmitters such that instantaneous values of the fitting parameters are calculated to fit current interference impairment and noise impairment terms to measured received signal impairment correlations.

21. The method of claim 20 wherein fitting the measured received signal impairment correlations by adapting the instantaneous values of the fitting parameters comprises formulating a fit between the current interference impairment and noise impairment terms and the measured received signal impairment correlations for each measurement using a Least Squares Estimation (LSE) estimation process.

22. The method of claim 21 wherein fitting to the measured received signal impairment correlations by adapting the instantaneous values of the fitting parameters further comprises concatenating the LSE formulations for each measurement into a joint LSE problem.

23. The method of claim 22 wherein fitting the measured received signal impairment correlations by adapting the instantaneous values of the fitting parameters further comprises solving the joint LSE problem.

24. The method of claim 20 wherein the interference impairment term for each measurement comprises an interference covariance matrix that is updated at each time instant based on current channel estimates, current finger delay assignments, and current received signal path delays associated with one of the plurality of transmitters.

25. The method of claim 24 wherein the interference covariance matrix for each measurement is updated at each time instant considering interference from the transmitter associated with the measurement as own-cell interference and considering interference from every other transmitter as other-cell interference.

26. The method of claim 20 wherein the noise impairment term comprises a noise covariance matrix that is updated over one or more time instants based on an autocorrelation function of a received signal filter pulse and current finger delay assignments.

27. A wireless communication terminal for use in a wireless communication network comprising:
a radio front-end circuit configured to provide a plurality of received signals from different transmitters; and
a receiver circuit configured to generate one or more combined signals by G-Rake processing received signals from the plurality of transmitters;
said receiver circuit configured to calculate combining weights by:
measuring received signal impairment correlations using despread values from pilot signals associated with the plurality of transmitters;
fitting the measured received signal impairment correlations to a weighted sum of impairment correlation terms associated with the plurality of transmitters and the measured correlations
jointly adapting fitting parameters associated with the plurality of transmitters responsive to the measured correlations and the impairment correlation terms; and
estimating impairment correlations by using a fitting process to fit the impairment correlation terms, scaled by the fitting parameters, to the measured signal impairment correlations.

28. The terminal of claim 27 wherein the impairment correlation terms comprise a plurality of interference correlation matrices and a noise correlation matrix.

29. The method of claim 28 wherein the interference correlation matrix corresponding to the transmitter associated with the measured correlation is computed as same-cell interference and the interference correlation matrices corresponding to other transmitters are computed as other-cell interference.

30. The method of claim 28 wherein jointly adapting fitting parameters associated with the plurality of transmitters responsive to the measured correlations and the impairment correlation terms comprises calculating updated fitting parameters for each slot based on the measured impairment correlations.

31. The method of claim 27 wherein jointly adapting fitting parameters associated with the plurality of transmitters responsive to the measured correlations and the impairment correlation terms comprises formulating a least squares estimation process on the fitting parameters to make the weighted sum of impairment correlation terms closely match measured impairment correlations.

32. The method of claim 31 wherein the receiver circuit is further configured to calculate new combining weights at each of a recurring predefined time slot.

33. The method of claim 32 wherein the receiver circuit is further configured to calculate updated fitting parameters for each slot by concatenating least squares problems formulated for each measurement into a joint least squares problem and solving the joint least squares problem.

34. A method of received signal processing, comprising:
for each significant base station, allocating one or more measurement fingers to a pilot signal;

computing medium coefficients for the path fingers;

computing net coefficients for all RAKE fingers allocated to the base station;

computing a measured interference matrix for the base station;

computing interference correlation terms for the base station;

constructing a parametric model scaling the interference correlation terms by fitting parameters; and formulating a least squares estimation process to solve the fitting parameters concatenating the least squares estimation processes for all base stations into a joint least squares estimation process; and solving the joint least squares estimation process to estimate the fitting parameters.

35. The method claim 34 further comprising estimating an impairment correlation matrix based on the fitting parameters and interference correlation terms.

36. The method of claim 35 further comprising generating combining weights and an SIR estimate based on the estimated impairment correlation matrix.

37. The method of claim 34 further comprising repeating the method steps at each predefined time slot.

38. The method of claim 34 wherein computing interference correlation terms for each base station comprises treating interference from that base station as own-cell interference and treating interference from all other base stations as other-cell interference.

39. The method of claim 34 wherein a base station is significant if it has an average received signal strength within a predetermined range of the greatest average received signal strength among the plurality of base stations.

40. The method of claim 39 wherein the predetermined range is dynamically altered during reception.

41. The method of claim 34 wherein a base station is significant if it has an average received signal strength that is the strongest or second strongest of all received signals.

* * * * *

UNITED STATES PATENT AND TRADEMARK OFFICE
CERTIFICATE OF CORRECTION

PATENT NO.         : 8,040,938 B2                                     Page 1 of 1
APPLICATION NO.    : 11/609373
DATED              : October 18, 2011
INVENTOR(S)        : Cairns et al.

It is certified that error appears in the above-identified patent and that said Letters Patent is hereby corrected as shown below:

In Column 2, Line 42, delete "=<$\alpha R_I(slot)+\beta_n(slot)$." and insert -- =$\alpha R_I(slot)+\beta R_n(slot)$. --, therefor.

In Column 14, Line 39, in Claim 29, delete "method" and insert -- terminal --, therefor.

In Column 14, Line 45, in Claim 30, delete "method" and insert -- terminal --, therefor.

In Column 14, Line 51, in Claim 31, delete "method" and insert -- terminal --, therefor.

In Column 14, Line 58, in Claim 32, delete "method" and insert -- terminal --, therefor.

In Column 14, Line 61, in Claim 33, delete "method" and insert -- terminal --, therefor.

Signed and Sealed this
Fourteenth Day of February, 2012

David J. Kappos
*Director of the United States Patent and Trademark Office*